United States Patent [19]

Duplessis et al.

[11] Patent Number: 4,489,412
[45] Date of Patent: Dec. 18, 1984

[54] SIGNAL DISTRIBUTION SYSTEM FOR A TIME-DIVISION EXCHANGE

[75] Inventors: Philippe Duplessis, Colombes; Michel Brusa, Plaisir, both of France

[73] Assignee: Compagnie Industrielle des Telecommunications Cit-Alcatel, Paris, France

[21] Appl. No.: 420,208

[22] Filed: Sep. 20, 1982

[30] Foreign Application Priority Data

Sep. 18, 1981 [FR] France ............... 81 17643

[51] Int. Cl.³ .................................. H04J 3/00
[52] U.S. Cl. .......................... 370/16; 370/58
[58] Field of Search ............. 370/16, 58, 63, 64

[56] References Cited

U.S. PATENT DOCUMENTS

| | | | |
|---|---|---|---|
| 3,920,914 | 11/1975 | Regnier et al. | 370/16 |
| 4,074,077 | 2/1978 | Charransol et al. | 370/58 |
| 4,107,480 | 8/1978 | Schlichte | 370/58 |
| 4,201,891 | 5/1980 | Lawrence et al. | 370/58 |
| 4,228,535 | 10/1980 | Workman et al. | 370/16 |
| 4,245,339 | 1/1981 | Agricola et al. | 370/58 |
| 4,276,637 | 6/1981 | Le Dieu | 370/16 |
| 4,413,335 | 11/1983 | Clements et al. | 370/16 |
| 4,425,640 | 1/1984 | Philip et al. | 370/58 |

Primary Examiner—Douglas W. Olms
Assistant Examiner—Kenneth I. Rokoff
Attorney, Agent, or Firm—Sughrue, Mion, Zinn, Macpeak & Seas

[57] ABSTRACT

A signal distribution signal for a time-division exchange has a distributed control architecture. Its switching network is organized as a plurality of independent planes (RXA to RXD) with terminal units (UT) and control units (UC) are connected via multiplex links (MX) and are synchronized by a time base (BDG) via clock signal distribution modules (MD). Each terminal or control unit is connected both to the switching network and to the clock signal distribution means by at least two independent parallel connections (F1, F2) each of which comprises multiplex links (MX) connected to different planes of the switching network, and at least one distribution link (D) connected to a different distribution module (MD) for each of said parallel connections connected to a given unit. Such exchanges are used for telecommunications purposes.

7 Claims, 7 Drawing Figures

SIGNAL DISTRIBUTION SYSTEM FOR A TIME-DIVISION EXCHANGE

FIELD OF THE INVENTION

The invention relates to a signal distribution system for a time-divison exchange, with exchange control means having distributed architecture.

BACKGROUND OF THE INVENTION

Such an exchange includes a time-division switching network to which a plurality of terminals are connected and to which distributed architecture control means are also connected. The control means comprises groups of identical control units, e.g. microprocessors.

Telephone service must continue even in the event of failure of one of the members of an exchange, and to ensure continued service it is conventional to install redundant units for the main functions.

It is also usual practice to connect these units by redundant links and to distribute time base signals to them in such a manner that a fault in one time base can, at worst, only affect a redundant unit.

It is common practice to group the units in security modules which are as independent as possible from one another in their links and other connections.

This kind of solution has drawbacks in an exchange of distributed architecture, particularly if the units are to be made as interchangeable as possible. This applies in particular to the control units and to the multiplex links. The purpose of making such units interchangeable is to obtain a very flexible and modular system. However, such an arrangement can lead to prohibitive multiplication of clock signal distribution means.

Preferred embodiments of the present invention remedy these drawbacks by providing a system in which the links and the clock signal distributions are organised in such a manner as to optimise the use of the redundant units and also so as to facilitate installation, maintenance and subsequent extensions.

Preferred embodiments of the invention also optimise the duration of data interchanges between units by reducing the time taken for the information to transit over the links, i.e. by making the links as short as possible.

SUMMARY OF THE INVENTION

The present invention provides a signal distribution system for a time-division exchange comprising:

a central switching network organised as a plurality of independent planes;

a plurality of terminal units, each connected to each plane of the switching network by at least one multiplex link;

exchange control means of distributed architecture comprising a plurality of control units, each likewise connected to each plane of the switching network by at least one multiplex link; and a time base supplying signals to clock signal distribution modules for distributing clock signals to said units;

wherein the exchange includes at least two independent parallel connections connecting each terminal unit via said multiplex links to different planes of the switching network and via clock signal distribution links and synchronisation signal distribution links to different distribution modules which are likewise provided with different power supplies.

Preferably, the terminal units and the control units are independently associated into groups each of which is connected to two independent parallel connections each of which connections comprises two multiplex links and one clock signal asynchronisation signal distribution link.

The clock signal and synchronisation signal distribution links may advantageously be centralised with the switching network, with the modules being located in the switches, and the parallel links extending to the various units from a distribution frame connected to the terminals of the switching network.

BRIEF DESCRIPTION OF THE DRAWINGS

An embodiment of the invention is described by way of example with reference to the accompanying drawings in which.

MORE DETAILED DESCRIPTION

Figure 1:
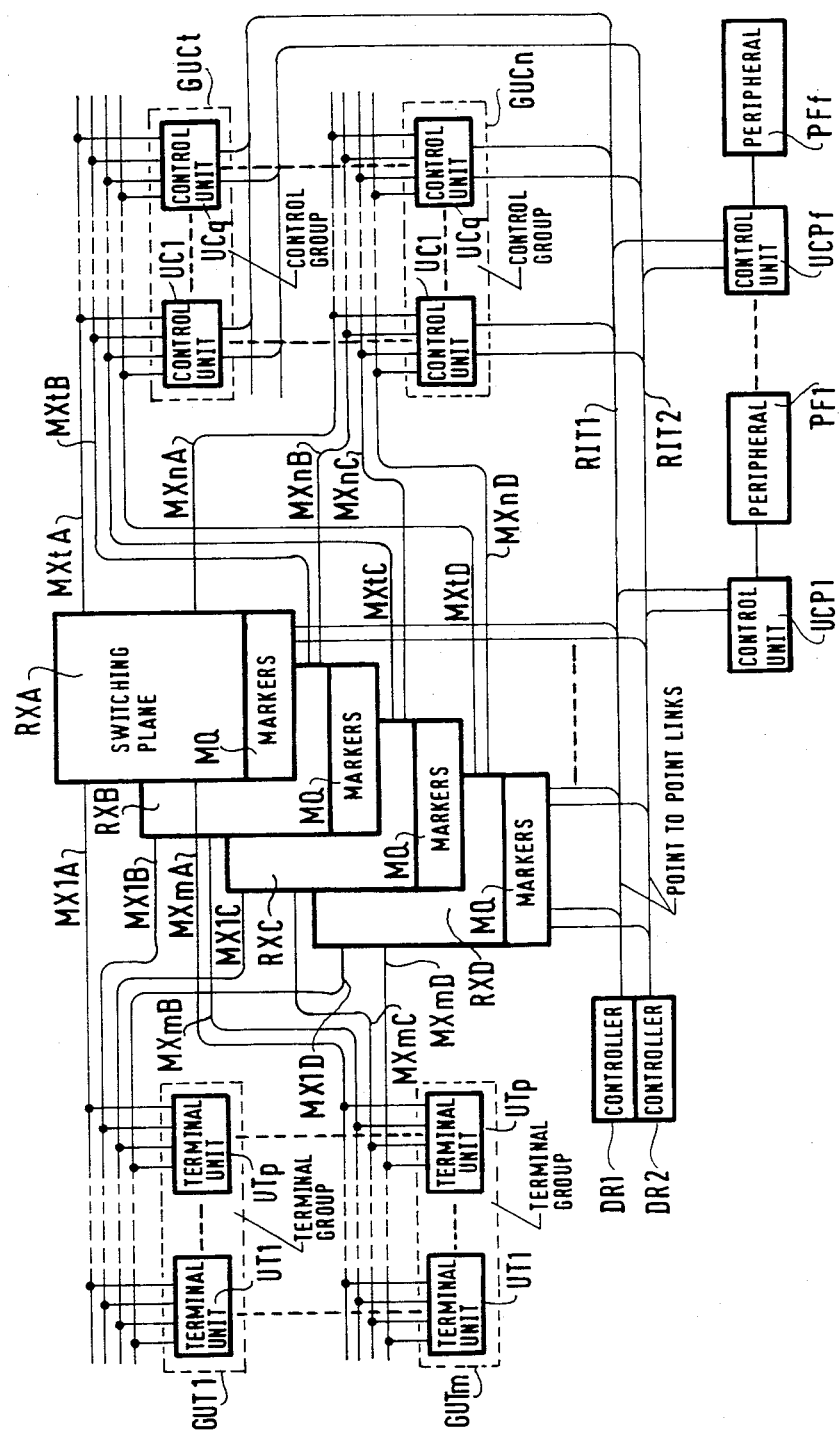
FIG. 1 is an overall block diagram of a time-division exchange.

The time division exchange shown in simplified manner in FIG. 1 comprises three main portions:

(1) m groups of various terminal units GUT1 to GUTm. The terminal units UT may be subscriber terminals, with analog and digital circuits, auxiliary terminals with circuits for signalling and/or applying tones and recorded announcements to lines, test terminals for testing subscriber lines and circuits, conference circuit terminals, etc.

(2) A single stage central switching network organised in independent planes, for example, four planes RXA to RXD.

(3) Exchange control means of distributed architecture constituted by t groups GUC1 to GUCt each comprising q identical control units UC. The control units are based on microprocessors and they are interchangeable. The exchange control means also includes f peripheral control units UCP1 to UCPf which control groups of peripheral PF1 to PFf. These units are advantageously identical to the preceding control units, but they cannot be completely interchangeable because of their differing physical connections with the peripherals they control.

These three main portions are interconnected by the following links:

(1) The terminal units UT are connected to each plane of the switching network by respective, first multiplex links MX (MX1A to MXmD), each of which comprises thirty-two time slots which are eight bits wide and operating at 2 Mbits/sec. in each transmission direction. The terminal units UT of the same group are connected in parallel to the same multiplex links MX.

(2) The control units UC are likewise connected to the switching network by second multiplex links MXn to MXt such as MXnA or MXtD with one link per group of control units to each plane. The messages interchanged between the control units and the terminal units travel via time slots in the multiplex links as connected through the switching network in a semi-permanent and reconfigurable manner. Data transmission channels are thus established which operate at 64 Kbits/sec. and which are used according to the HDLC procedure standardised by the CCITT.

(3) The control units UC and UCP, e.g. UC1 or UCPf are connected to one another by two identical point-to-point links RIT1 and RIT2 which are duplicated for security reasons, these links being of the series type and likewise operating according to an HDLC procedure.

The central switching network is controlled by markers MQ themselves controlled by the control units UC via the point-to-point links RIT1 and RIT2.

Access to the point-to-point links RIT1 and RIT2 is controlled by a duplicated controller DR1, DR2 which delivers sent authorisations and supervises the duration for which the links are used. Each of the point-to-point links RIT1 and RIT2 comprises five pairs of wires going to each unit connected thereto, for the purposes of calling, authorisation, clock transmission, signal transmission and signal reception.

Figure 2:
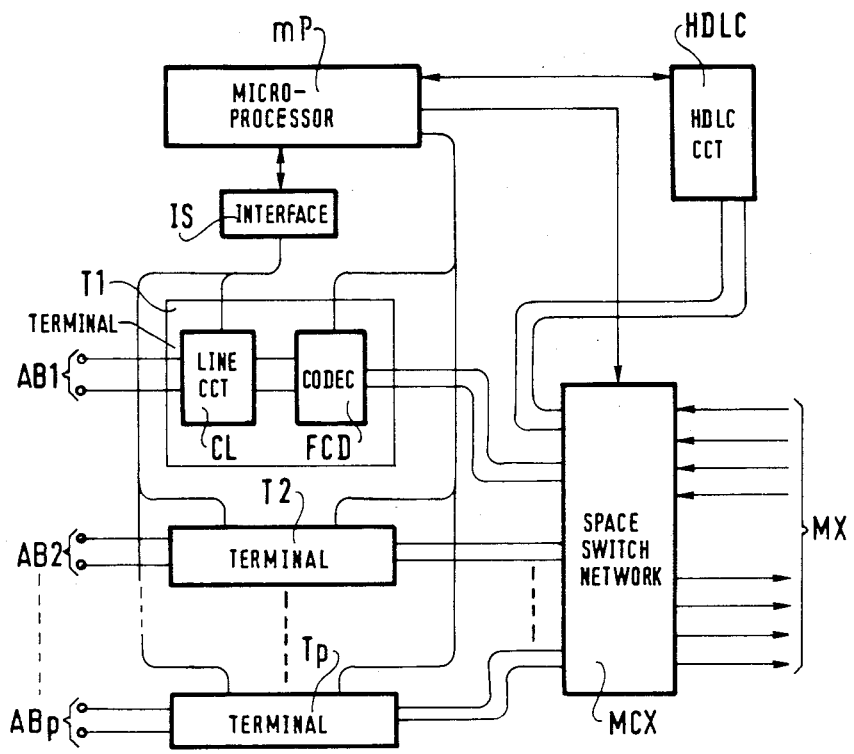
FIG. 2 is a block diagram of a subscriber terminal unit.

The terminal units UT and the control units UC and UCP, together with the markers MQ all have send-/receive circuits for HDLC type messages, e.g. MC 6854 (MOTOROLA) or 8273 type circuits (INTEL), with such a circuit being shown in FIG. 2 in the context of a terminal unit UT.

Each of the terminal units UT has a single stage of switching for connecting any terminal in the unit to a time slot in any of the multiplex links MX connected to said unit.

Each terminal T1 to Tp comprises a line circuit CL connected to the A and the B wires which go from the terminal to the subscriber equipment. Each circuit CL includes power supply means, protector means, loop supervisory means, ringing current injector means, and a filter and codec circuit FCD providing an interface between analog and digital signals.

Each codec FCD is also connected to a space switching network MCX.

Each terminal unit is controlled by a microprocessor mP which is connected to the four multiplex links MX by a send/receive circuit of the HDLC type, and via the space switching matrix MCX, in parallel with the terminals T1 to Tp.

Time switching is provided in the codecs by their synchronisation on a chosen time slot under the control of the microprocessor mP of the terminal unit. The microprocessor also controls the line circuits CL via a supervisory and control interface IS.

The central switching network comprises a single switching stage. It is organised in independent planes, and in the present example there are four such planes.

Figure 3:
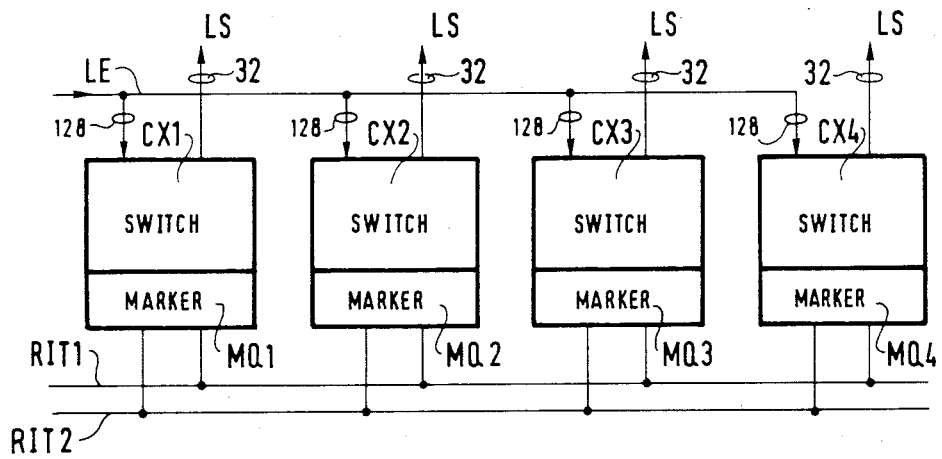
FIG. 3 is a block diagram of one plane of the switching network.

Each plane has a capacity of 128 multiplex links (FIG. 3), i.e., it can connect any time slot from any one of the 128 inlet links LE to any time slot of any of the 128 outlet links LS. Each plane comprises four switches CX1 to CX4, each of which is equipped with its own marker MQ, e.g. MQ1, and with a clock signal distribution module MB (not shown). Each switch serves all 128 inlet links LE and 32 of the outlet links LS. The inlet links LE are multiplied over the switches of a given plane. The markers MQ of the switches CX are connected to the point-to-point links RIT1 to RIT2 in the manner mentioned above.

Figure 4:
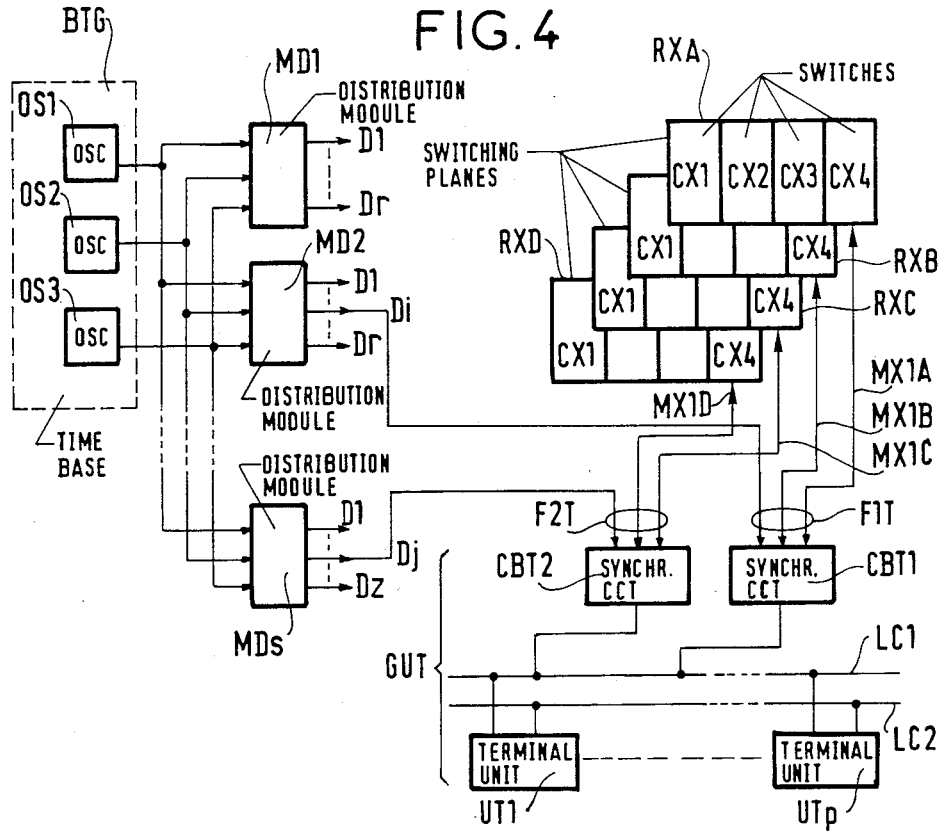
FIG. 4 is a diagram showing the theory of operation of a distribution system in accordance with the invention.

FIG. 4 shows the system for distributing the signals to a groups of terminal units comprising p terminal units UT1 to UTp.

In accordance with the invention the distribution of the signals is distributed both for the groups of terminal units and for the groups of control units. This done by means of two synchronisation and clock circuits CBT1, CBT2 which are identical but which are shown in the drawings only in relation to a group of terminal units GUT. These circuits serve to:

(1) Synchronise the signals on two of the four multiplex links which connect the group to the switching network, e.g. CBT1 for MX1A and MX1B, with the two circuits CBT1 and CBT2 of a single group being connected to different planes of the switching network and to independent distribution modules MD;

(2) Generate timing signals as required by all the units in the group on the basis of the clock signal and the frame synchronising signal originating from the overall time base BTG of the exchange.

The synchronisation and clock circuits CBT1 and CBT2 each distribute all of the time and multiplexing signals required to the units of a group, via two links LC1 and LC2 which are individually assigned to each of them, and which serve all of the units.

The overall time base BTG comprises three oscillators OS, and it may, for example, be of the type described in the Applicants' published patent specification No. 2.390.856.

Each of the oscillators OS, e.g. oscillator OS1, delivers a clock signal H and a frame synchronising signal SY at a frequency equal to the frame frequency of the multiplex links.

Synchronous distribution of the clock signals H and the synchronising signals SY to all the units in the exchange is provided by independent distribution modules MD1 to MDs which perform a majority choice selection on pairs of signals H and SY as received from the three oscillators, which check for faults, and which distribute the signals to r destinations via r links D per module, such as the link Di from the distribution module MD2 to a destination which comprises the time base circuit CBT1. The links D and LC are constituted as described below.

Figure 5:
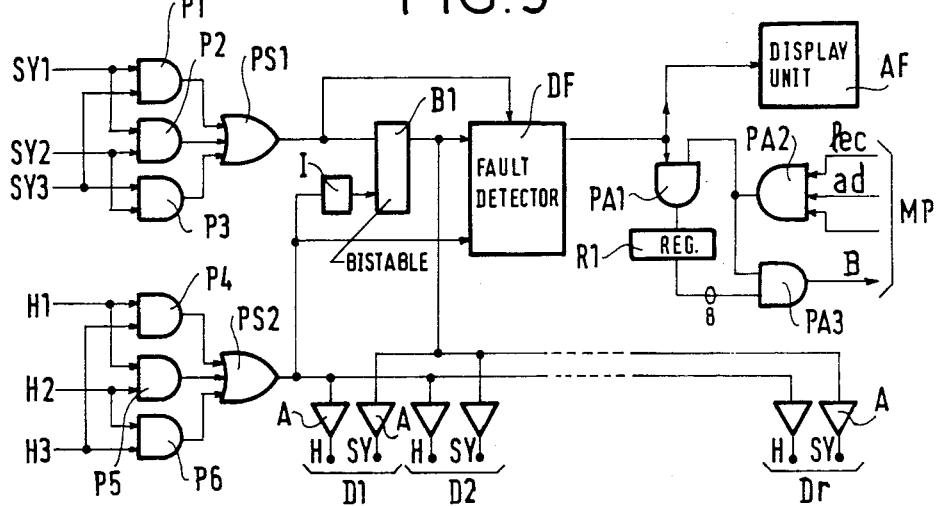
FIG. 5 is a circuit diagram of a time base distribution module.

FIG. 5 shows an example of a distribution module MD. The synchronisation signals SY1 to SY3 and the clock signals H1 to H3 from the three oscillators are received by two majority choice circuits each of which comprises three AND gates P such as P1 and an OR gate PS such as PS1.

The OR gate PS1 is connected to a bistable B1 which is triggered by the falling edge in the signal H via an inverter I. The outputs from the bistable B1 and from the OR gate PS2 respectively supply the synchronising signal SY and the clock signal H to corresponding wires of the links D1 to Dr via amplifiers A. A fault detector DF connected to the output from the gates PS1 and PS2 and from the bistable B1 is connected to the input of a display unit AF for signalling the presence of distribution faults. Naturally the oscillators have their own means for detecting faults. A data interchange register R1 and access gates PA1 to PA3 enable the microprocessor MP in the marker MX of the switch in which the distribution module MD is located to supervise the distribution module MD. In the embodiment described below, the modules are located in slots of the switching network.

The register R1 can be read on the processor bus B by means of an enable signal provided by marking the address "ad" and a read control signal "lec".

Figure 6:
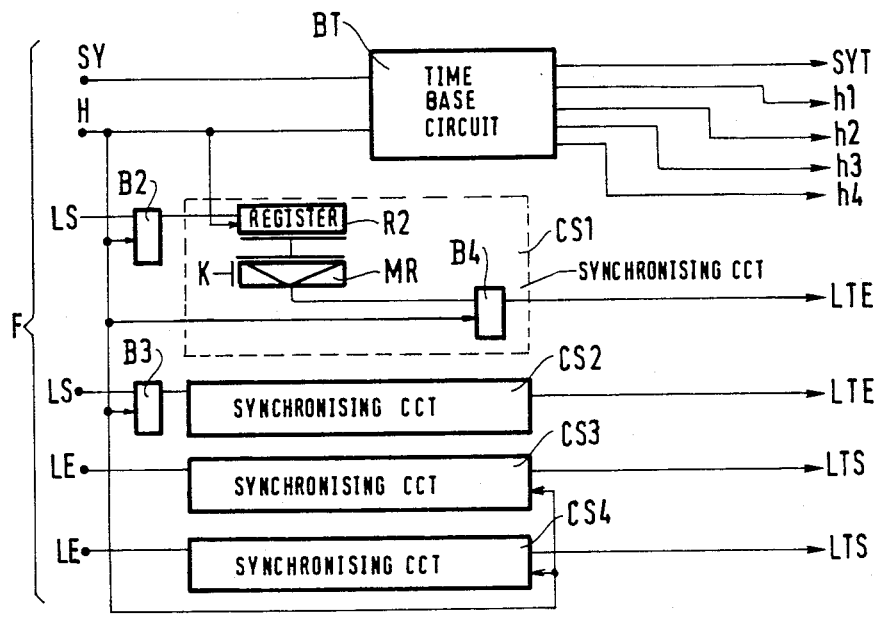
FIG. 6 is a block diagram of a time base circuit used for a group of terminal units.

In a group of terminal units GUT each clock and synchronising circuit CBT is connected to a clock distribution module MD and to two multiplex links MX, or in other words to two outlet links LS and to two inlet links LE (FIG. 6). The circuits CBT each comprise an internal time base circuit BT which generates synchronising signals SYT and clock signals h1 to h4 required by the terminal units UT, as well as by the synchronising circuits CS1 to CS4 for the multiplex links (FIG. 6).

The synchronising circuits CS1 and CS2 are inserted between the two outlet links LS and the two inlet links to the terminal LTE; the synchronisation circuits CS3 and CS4 are inserted between the two outlet links from the terminal LCS and the two inlet links LE.

Further, the outlet links LS are sampled by bistables B2 and B3 under the control of the clock signals H.

The synchronisation circuits CS, e.g. CS1, are constituted by a buffer register R2, a multiplexer MR whose address K is hard wired in such a manner as to introduce a constant phase shift which depends on the type of terminal units in the group concerned, and an outlet bistable B4.

Figure 7:
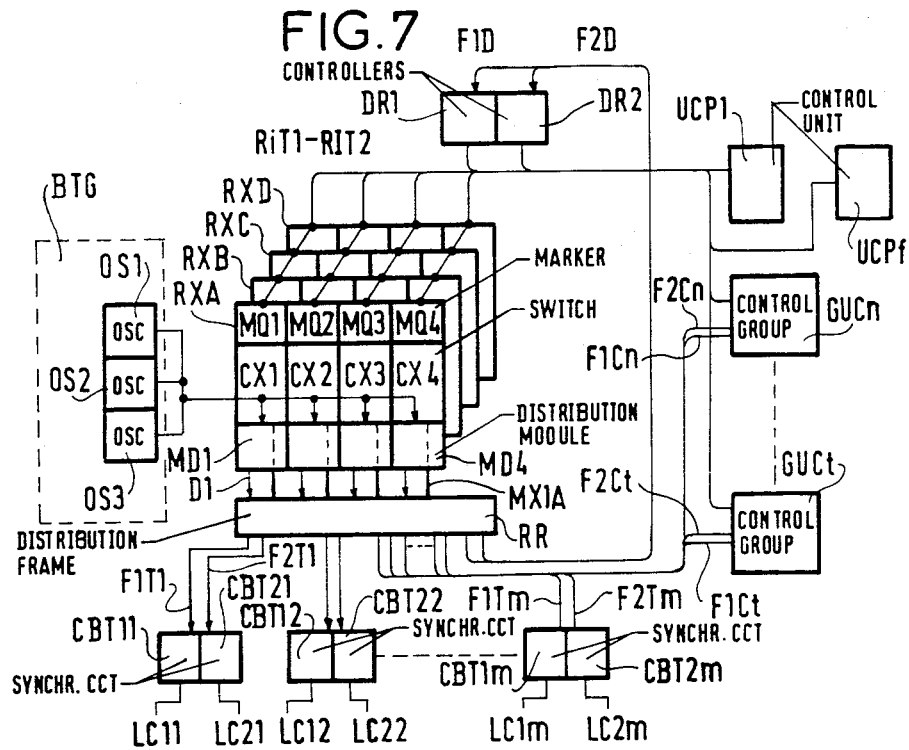
FIG. 7 shows how the synchronisation signals and the clock signals are distributed in a time-division exchange of the kind shown in FIG. 1.

FIG. 7 shows how the time signals are distributed in a time division exchange of the kind described above.

Given the central place occupied by the switching network and the redundancy it provides by means of its independent planes, the distribution modules MD have been located in the network equipments, for example one module MD (e.g. a printed circuit card) per switch.

A distribution frame RR is used to bring together the signals from the different switches CX, e.g. CX1, and from the distribution modules MD for their onward transmission to the various groups. The distribution frame RR is located near to the switching network to whose terminals it is connected. This is obtained by means of two parallel connections F per group of terminal unit GUT, e.g. parallel connections F1T1 and F2T2 connected to the signal and synchronising circuits CBT11 and CBT21 of the group GUT1 and the parallel connections F1Cn and F2Cn of the control unit group GuCn. Each parallel connection F comprises two outlet links LS, two inlet links LE, one clock link H and one synchronising link SY (see FIG. 6).

Two additional parallel connections F1D and F2D (FIG. 7) supply clock signals H and synchronising signals SY to the controllers DR1 and DR2 to enable them to generate clock signals on the point-to-point links RIT1 and RIT2 which connect the control units to one another and to the markers.

The two parallel connections F1 and F2 serving a given unit are completely independent since their multiplex links MX are connected to different planes, in addition, the corresponding distribution modules MD are served by different power supplies.

The choice of which one of the two parallel connections F1 and F2 is active at any one moment may be performed independently by the microprocessor provided in each unit, the microprocessor having its own oscillator.

Suppose, for example, that a group of terminal units GUT is supervised by a control unit UC which cyclicly polls all the terminal units UT under its supervision. Any fault on the active parallel connection will be detected by the terminal units UT since they will cease to receive the polling signal, and they will therefore change over to the other parallel connection and they will also change over their time slot connecting them to the control unit UC.

The control unit UC will be made aware of the change-over by identifying the time slots on which it receives an acknowledgement to its polling signal.

These principles are applied to all types of terminal unit: subscriber units, line units, signalling units, tone generator units, recorded announcement units, and units for testing lines and junctors.

This duplicated distribution considerably reduces the number of modules that are necessary. For example, for an average sized exchange comprising thirty interchangeable control units UC, simple distribution would require thirty modules to ensure that a fault would not put more than one unit out of service, whereas, distribution in accordance with the invention to the same thirty control units only requires twelve modules each having ten distributions running therefrom, supposing that no more than 120 distributions are required. Two independent power supplies are also necessary.

By connecting six distribution modules to each power supply the thirty control units UC may be associated with the modules in such a manner that a fault in one of the power supplies or a fault in one of the modules does not put any of the control units out of service, while a simultaneous fault in a module and a power supply or of two modules will at worst only put one control unit out of service.

We claim:

1. A signal distribution system for a time-division exchange comprising:
    a central switching network organised as a plurality of independent planes;
    a plurality of terminal units, each connected to each plane of the switching network by at least one first multiplex link,
    exchange control means of distributed architecture comprising a plurality of control units, each likewise connected to each plane of the switching network by at least one second multiplex link; and
    a time base supplying signals to clock signal distribution modules for distributing clock signals to said units by means of clock signal and synchronisation signal distribution links; and
    wherein the exchange includes at least two independent parallel connections connecting each terminal unit via said first multiplex links to different planes of the switching network and via said clock signal distribution links and synchronisation signal distribution links to different distribution modules which are likewise provided with different power supplies.

2. A distribution system according to claim 1, wherein the exchange further includes at least two independent parallel connections connecting each control unit via said second multiplex links to different lanes of the switching network and via said clock signal distribution links and synchronisation signal distribution links to different distribution modules which are likewise provided with different power supplies.

3. A distribution system according to claim 1 wherein the terminal units are organised in groups and wherein each group is supplied by the same pair of parallel connections each of which comprises two first multiplex links and one clock signal and synchronisation signal distribution link.

4. A system according to claim 2 wherein the control units are organised in groups and wherein each group is supplied by the same pair of parallel connections each of which comprises two second multiplex links and one clock signal and synchronisation signal distribution link.

5. A system according to claim 1, wherein the parallel connections serving the various groups of control units and terminal units are connected to a single distribution frame which is connected to the terminals of the switching network and from which all the said parallel connections are distributed to the various units.

6. A system according to claim 5, wherein each plane of the switching network is organised as a plurality of switches controlled by respective markers and wherein each distribution module is associated with a switch and supervised by the marker thereof.

7. A system according to claim 1, wherein each of said parallel connections in each group of terminal or control units is connected to a clock and synchronisation circuit comprising a time base which supplies clock signals and synchronisation signals to the parallel connection and synchronisation circuits serving the inlet multiplex links and the outlet multiplex links connected to the group.

* * * * *